(12) United States Patent
Hioki

(10) Patent No.: US 12,163,040 B2
(45) Date of Patent: Dec. 10, 2024

(54) INK-JET TREATMENT LIQUID, INK-JET TEXTILE PRINTING DEVICE, AND INK-JET TEXTILE PRINTING METHOD

(71) Applicant: KYOCERA CORPORATION, Kyoto (JP)

(72) Inventor: Jun Hioki, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/557,956

(22) PCT Filed: Aug. 30, 2022

(86) PCT No.: PCT/JP2022/032482
§ 371 (c)(1),
(2) Date: Oct. 30, 2023

(87) PCT Pub. No.: WO2023/037924
PCT Pub. Date: Mar. 16, 2023

(65) Prior Publication Data
US 2024/0240045 A1  Jul. 18, 2024

(30) Foreign Application Priority Data
Sep. 7, 2021 (JP) ................................. 2021-145355

(51) Int. Cl.
| | |
|---|---|
| *C09D 11/54* | (2014.01) |
| *B41J 3/407* | (2006.01) |
| *B41J 11/00* | (2006.01) |
| *B41M 3/00* | (2006.01) |
| *B41M 7/00* | (2006.01) |

(52) U.S. Cl.
CPC .............. *C09D 11/54* (2013.01); *B41J 3/4078* (2013.01); *B41J 11/002* (2013.01); *B41M 3/008* (2013.01); *B41M 7/0018* (2013.01); *B41M 7/009* (2013.01)

(58) Field of Classification Search
CPC ....... C09D 11/322; C09D 11/38; C09D 11/54; B41M 5/0017; B41M 7/0018; B41J 11/0015; C08L 83/04; D06P 1/5292
See application file for complete search history.

(56) References Cited

U.S. PATENT DOCUMENTS

| | | | | |
|---|---|---|---|---|
| 6,777,462 B2 * | 8/2004 | Smith | .................... | C09D 11/40 |
| | | | | 524/404 |
| 2014/0357773 A1 * | 12/2014 | Liles | ..................... | B05D 3/007 |
| | | | | 524/377 |
| 2020/0317942 A1 * | 10/2020 | Yamada | ............... | C09D 11/322 |

(Continued)

FOREIGN PATENT DOCUMENTS

| | | |
|---|---|---|
| JP | 2000282376 A | 10/2000 |
| JP | 2000290884 A | 10/2000 |

(Continued)

OTHER PUBLICATIONS

Translation of Written Opinion of the ISA filed with IDS Oct. 30, 2023. (Year: 2024).*

*Primary Examiner* — John Zimmermann
(74) *Attorney, Agent, or Firm* — HAUPTMAN HAM, LLP

(57) ABSTRACT

An inkjet treatment liquid contains emulsified particles containing a silicone oil and an aqueous medium, in which a percentage content of the silicone oil is 7% by mass or more and 15% by mass or less.

19 Claims, 1 Drawing Sheet

(56) References Cited

U.S. PATENT DOCUMENTS

| | | | |
|---|---|---|---|
| 2021/0198509 A1 | 7/2021 | Sekiguchi et al. | |
| 2022/0349122 A1* | 11/2022 | Hioki | D06P 5/30 |
| 2023/0211616 A1 | 7/2023 | Hioki | |

FOREIGN PATENT DOCUMENTS

| | | |
|---|---|---|
| JP | 2006124855 A | 5/2006 |
| JP | 2013075524 A | 4/2013 |
| JP | 2020105304 A | 7/2020 |
| JP | 2021102337 A | 7/2021 |
| WO | 2021182338 A1 | 9/2021 |

* cited by examiner

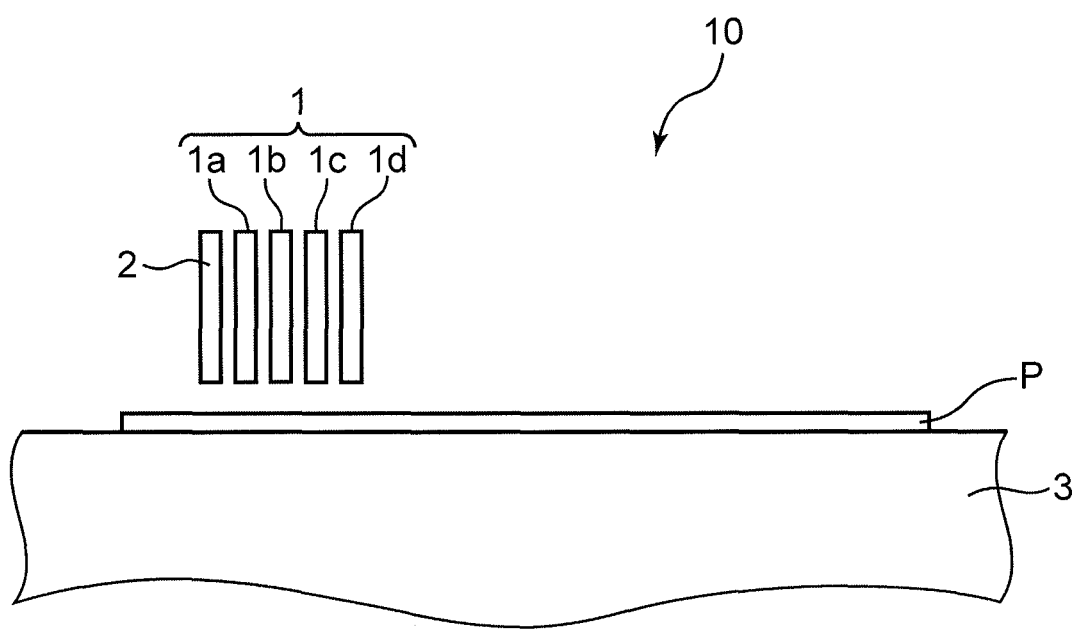

INK-JET TREATMENT LIQUID, INK-JET TEXTILE PRINTING DEVICE, AND INK-JET TEXTILE PRINTING METHOD

RELATED APPLICATIONS

The present application is a National Phase of International Application Number PCT/JP2022/032482 filed Aug. 30, 2022, which claims the benefit of priority from Japanese Patent Application No. 2021-145355, filed on Sep. 7, 2021.

TECHNICAL FIELD

The present disclosure relates to an inkjet treatment liquid, an inkjet textile printing apparatus, and an inkjet textile printing method.

BACKGROUND ART

In inkjet textile printing methods, for example, ink containing pigments are used. In order to improve the color fastness to rubbing of textile printing targets (hereinafter sometimes referred to as textile printing articles) on which images are formed, ink containing pigments is sometimes used with post-treatment liquids.

Meanwhile, transport rollers for inkjet recording apparatuses are conventionally known (see Patent Literature 1, for example). In the transport roller described in Patent Literature 1, a treatment liquid containing one or both of fullerene and a fullerene derivative is applied to the surface of the transport roller.

CITATION LIST

Patent Literature

Patent Literature 1: JP 2013-75524 A

SUMMARY OF INVENTION

An inkjet treatment liquid according to a first aspect of the present disclosure comprises emulsified particles containing a silicone oil and an aqueous medium, wherein a percentage content of the silicone oil is 7% by mass or more and 15% by mass or less.

BRIEF DESCRIPTION OF DRAWINGS

FIG. 1 is a side view illustrating an example of an inkjet textile printing apparatus according to a second embodiment of the present disclosure.

DESCRIPTION OF EMBODIMENTS

In recent years, in inkjet textile printing technique, further improvement in the color fastness to rubbing of textile printing articles has been required. It is assumed that the color fastness to rubbing of textile printing articles changes depending on the kind of silicone oil contained in the treatment liquid, the average particle size of emulsified particles containing a silicone oil, the amount of treatment liquid ejected, and the like (The treatment liquid may be called as a processing solution.). For example, in a case where the amount of treatment liquid ejected is a small amount, it is assumed that the color fastness to rubbing of textile printing articles may be affected. In a case where the average particle size of emulsified particles containing a silicone oil in the treatment liquid is excessively small, it is assumed that the color fastness to rubbing of textile printing articles may be affected. Hence, from the viewpoint other than the kind of silicone oil and the average particle size of emulsified particles, it is suitable to know the conditions for the properties of an inkjet treatment liquid under which a textile printing article excellent in the color fastness to rubbing can be fabricated. Accordingly, an embodiment of the present disclosure provides an inkjet treatment liquid capable of fabricating a textile printing article excellent in the color fastness to rubbing from the viewpoint of concentration adjustment of silicone oil contained in the treatment liquid.

Furthermore, it is more suitable when the inkjet treatment liquid suppresses deterioration in the texture of textile printing article and is excellent in ejectability from the processing head of an inkjet textile printing apparatus.

The inkjet treatment liquid of the present disclosure can suppress deterioration in the texture of textile printing article, can fabricate a textile printing article excellent in the color fastness to rubbing, and is excellent in ejectability from the processing head of an inkjet textile printing apparatus.

Hereinafter, embodiments of the present disclosure will be described. In this specification, the measured value of volume median diameter ($D_{50}$) is the median diameter measured using a laser diffraction/scattering particle size distribution analyzer ("LA-950" manufactured by HORIBA, Ltd.), unless otherwise specified. Hereinafter, the volume median diameter is sometimes referred to as "$D_{50}$". The "main component" of a material means a component that is contained in the material in the largest amount by mass, unless otherwise specified. "Specific gravity" means specific gravity at 25° C. unless otherwise specified. Acryl and methacryl are collectively referred to as "(meth)acryl" in some cases. Each component described in this specification may be used singly or in combination of two or more kinds thereof.

First Embodiment: Inkjet Treatment Liquid

Hereinafter, an inkjet treatment liquid (hereinafter, also referred to as treatment liquid) according to the first embodiment of the present disclosure will be described. The treatment liquid according to the first embodiment contains emulsified particles and an aqueous medium. The emulsified particles are dispersed in the aqueous medium of the treatment liquid. In other words, the treatment liquid according to the first embodiment is an emulsion, more specifically, an oil-in-water (O/W) emulsion.

The treatment liquid according to the first embodiment is suitably used, for example, in an inkjet textile printing apparatus and an inkjet textile printing method, which will be described later. The treatment liquid according to the first embodiment is, for example, a treatment liquid for post-processing. For details, after an image is formed in the image forming region of a textile printing target with ink, the image forming region is post-processed with the treatment liquid according to the first embodiment.

<Emulsified Particles>

The emulsified particles contained in the treatment liquid contain a silicone oil. The silicone oil preferably includes at least an ionic functional group-containing silicone oil (The ionic functional group be called as an ionic group). By containing an ionic functional group-containing silicone oil, a textile printing article particularly superior in the color fastness to wet rubbing can be fabricated. The silicone oil may be a silicone oil other than the ionic functional group-containing silicone oil (hereinafter sometimes referred to as another silicone oil). Alternatively, the silicone oil may contain both an ionic functional group-containing silicone oil and another silicone oil. In this case, both the ionic functional group-containing silicone oil and another silicone oil may be contained in one emulsified particle. Alternatively, emulsified particles contained in the treatment liquid may be two or more kinds, and for example, an ionic functional group-containing silicone oil may be contained in the first emulsified particles and another silicone oil may be contained in the second emulsified particles. As the emulsified particles contain at least a silicone oil, particularly an ionic functional group-containing silicone oil, the following first to fourth advantages are obtained.

The first advantage will be described. A silicone oil has a friction reducing effect. As the textile printing target is post-processed with the treatment liquid, the image formed on the textile printing target is coated with a silicone oil, and the coefficient of friction of the surface of the textile printing target decreases. As a result, even in a case where the image formed on the textile printing target is rubbed, the color does not easily fade, and a textile printing article excellent in the color fastness to dry rubbing and the color fastness to wet rubbing can be fabricated. As the textile printing target is coated with a silicone oil that has a friction reducing effect, friction between threads of the textile printing target is reduced. As a result, stiffening of the textile printing target caused by image formation is reduced, and deterioration in the texture of textile printing article is suppressed.

The second advantage will be described. A silicone oil has water repellency. As the textile printing target is post-processed with the treatment liquid, the textile printing target is coated with a water repellent silicone oil and water repellency is imparted to the surface of the textile printing target. As a result, even in a case where the image formed on the textile printing target is rubbed in a wet state, the color does not easily fade, and a textile printing article excellent in the color fastness to wet rubbing can be fabricated.

The third advantage will be described. Particularly in a case of containing at least an ionic functional group-containing silicone oil, it is presumed that an ionic bond is formed between the ionic functional group and the textile printing target and between the ionic functional group and the ink ejected onto the textile printing target as the ionic functional group-containing silicone oil has an ionic functional group. As an ionic bond is formed, the ionic functional group-containing silicone oil is less likely to be washed away by water from the textile printing target and ink. As a result, a textile printing article more superior in the color fastness to wet rubbing can be fabricated.

The fourth advantage will be described. Particularly in a case of containing at least an ionic functional group-containing silicone oil, as the ionic functional group-containing silicone oil has an ionic functional group, the emulsified particles containing the ionic functional group-containing silicone oil are suitably dispersed in the aqueous medium of the treatment liquid. Such a treatment liquid can be more suitably ejected from the processing head of an inkjet textile printing apparatus. In a case where the treatment liquid is ejected from the processing head, the amount of treatment liquid used is reduced compared to a case where the textile printing article is immersed in the treatment liquid. Therefore, stiffening of the textile printing target is less likely to be caused and deterioration in the texture of textile printing article is further suppressed. In addition, in a case where the treatment liquid is ejected from the processing head, a silicone oil having a high viscosity can be used compared to a case where ink containing a silicone oil as a base oil is ejected from the recording head. Therefore, a textile printing article more superior in the color fastness to rubbing can be fabricated. The first to fourth advantages have been described above.

Here, it is assumed that the color fastness to rubbing of textile printing articles changes depending on the concentration of silicone oil contained in the treatment liquid. For example, the color fastness to rubbing of textile printing articles may be affected when the concentration of silicone oil is too low. Hence, an inkjet treatment liquid capable of fabricating a textile printing article excellent in the color fastness to rubbing is required.

In the first embodiment, the percentage content of silicone oil in the treatment liquid is preferably 7% by mass or more and 15% by mass or less. When the percentage content of silicone oil is in the range of 7% by mass or more and 15% by mass or less, the inkjet treatment liquid according to the first embodiment suppresses deterioration in the texture of textile printing article, can fabricate a textile printing article excellent in the color fastness to rubbing, and is excellent in ejectability from the processing head of an inkjet textile printing apparatus. A textile printing article excellent in the color fastness to rubbing can be fabricated particularly when the percentage content of silicone oil is within such a concentration range.

Specifically, when the percentage content of silicone oil is less than 7% by mass, both the color fastness to dry rubbing and the color fastness to wet rubbing of textile printing article decrease. Furthermore, when the percentage content of silicone oil is less than 7% by mass, the texture of textile printing article also deteriorates. Meanwhile, when the percentage content of silicone oil exceeds 15% by mass, the amount of solid substances in the treatment liquid increases and the ejectability from the processing head becomes poor. As a result, the treatment liquid is not ejected suitably, and this leads to decreases in both the color fastness to dry rubbing and the color fastness to wet rubbing of textile printing article. In a case where at least an ionic functional group-containing silicone oil is contained as the silicone oil, when the percentage content of silicone oil exceeds 15% by mass, the amount of ionic functional groups in the ionic functional group-containing silicone oil contained in the silicone oil increases. Therefore, it is difficult to impart water repellency to the surface of textile printing target, and both the color fastness to dry rubbing and the color fastness to wet rubbing of textile printing article decrease.

The percentage content of silicone oil in the treatment liquid is preferably 8% by mass or more, more preferably 9% by mass or more, still more preferably 10% by mass or more. The percentage content of silicone oil in the treatment liquid is preferably 14% by mass or less, more preferably 13% by mass or less. In particular, by setting the percentage content of silicone oil in the treatment liquid to be within the range of 10% by mass or more and 13% by mass or less, a textile printing article further superior in both the color fastness to dry rubbing and the color fastness to wet rubbing can be fabricated.

The percentage content of silicone oil in the treatment liquid means the percentage of the mass of silicone oil with respect to the mass of the treatment liquid. In a case where the emulsified particles contain two or more kinds of silicone oils (for example, ionic functional group-containing silicone oil and another silicone oil), the percentage content of silicone oil means the percentage of the total mass of the two or more kinds of silicone oils with respect to the mass of the treatment liquid.

The viscosity of silicone oil is preferably 500 mm²/s (namely, mm²/second) or more. When the viscosity of silicone oil is 500 mm²/s or more, the silicone oil is less likely to be detached from the textile printing article by rubbing, and a textile printing article superior in the color fastness to dry rubbing and the color fastness to wet rubbing can be fabricated. As already described, the treatment liquid according to the first embodiment is excellent in ejectability from the processing head of an inkjet textile printing apparatus. In a case where the treatment liquid is ejected from the processing head, the amount of treatment liquid used is reduced compared to a case where the textile printing article is immersed in the treatment liquid. Therefore, in a case where a silicone oil having a high viscosity of 500 mm²/s or more is used in the treatment liquid as well, stiffening of the textile printing target is less likely to be caused and deterioration in the texture of textile printing article is further suppressed.

The upper limit of the viscosity of silicone oil is not particularly limited. The viscosity of silicone oil is, for example, preferably 100000 mm²/s or less, preferably 6000 mm²/s or less. The viscosity of silicone oil may be, for example, within the range of two values selected from the group consisting of 500 mm²/s, 700 mm²/s, 900 mm²/s, 1000 mm²/s, 1100 mm²/s, 1200 mm²/s, 1500 mm²/s, 1700 mm²/s, 1800 mm²/s, 2000 mm²/s, 3000 mm²/s, 5700 mm²/s, and 6000 mm²/s.

The viscosity of silicone oil means kinematic viscosity at 25° C. In a case where the emulsified particles contain two or more kinds of silicone oils (for example, ionic functional group-containing silicone oil and another silicone oil), the viscosity of silicone oil means the viscosity of a mixture of the two or more kinds of silicone oils.

The viscosity of silicone oil is measured in conformity with the method described in JIS (Japanese Industrial Standards) Z8803:2011 (method for measuring viscosity of liquid). For example, the silicone oil can be extracted from the treatment liquid with toluene, washed, and dried to separate the silicone oil from the treatment liquid, and the viscosity of the silicone oil can be measured.

The average particle size of emulsified particles (dispersed particle size in an aqueous medium) is preferably 100 nm or more and 250 nm or less, more preferably 120 nm or more and 220 nm or less, still more preferably 150 nm or more and 200 nm or less. When the average particle size of emulsified particles is within such a range, the treatment liquid containing the emulsified particles can be more suitably ejected from the processing head of an inkjet textile printing apparatus. The average particle size of emulsified particles may be, for example, within the range of two values selected from the group consisting of 100 nm, 120 nm, 135 nm, 150 nm, 155 nm, 160 nm, 180 nm, 200 nm, 210 nm, 220 nm, and 250 nm.

The average particle size of emulsified particles means a harmonic average particle size (also called a cumulant average particle size) based on the scattered light intensity calculated by the cumulant method. The average particle size of emulsified particles is measured in conformity with the method described in ISO 13321:1996 (Particle size analysis-Photon correlation spectroscopy).

The emulsified particles may further contain components other than a silicone oil. However, when the emulsified particles contain only a silicone oil, a textile printing article excellent in the color fastness to rubbing can be fabricated more reliably and deterioration in the texture of textile printing article can be suppressed more reliably.

As already described, the silicone oil contained in the emulsified particles may be any one of an ionic functional group-containing silicone oil and another silicone oil. Alternatively, the silicone oil may contain both an ionic functional group-containing silicone oil and another silicone oil. In this case, both the ionic functional group-containing silicone oil and another silicone oil may be contained in one emulsified particle. Alternatively, an ionic functional group-containing silicone oil may be contained in the first emulsified particles and another silicone oil may be contained in the second emulsified particles. Hereinafter, the ionic functional group-containing silicone oil and another silicone oil will be described.

(Ionic Functional Group-Containing Silicone Oil)

The ionic functional group-containing silicone oil is a modified silicone oil, more specifically, an ionic functional group-modified silicone oil. Examples of ionic functional group-modified silicone oils include modified silicone oils in which ionic functional groups are introduced into side chains and modified silicone oils in which ionic functional groups are introduced into terminal groups.

Modified silicone oils in which ionic functional groups are introduced into side chains have a first terminal group represented by the following Formula (1a), a repeating unit represented by the following Formula (1b), a repeating unit represented by the following Formula (1c), and a second terminal group represented by the following Formula (1d).

[Chem. 1]

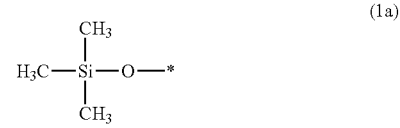

(1a)

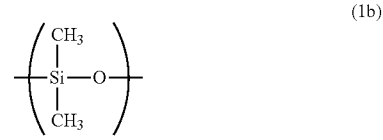

(1b)

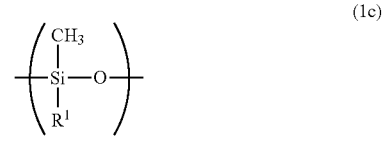

(1c)

(1d)

\* in Formula (1a) denotes a dangling bond that bonds to a silicon atom in the repeating unit represented by Formula (1b) or (1c). \* in Formula (1d) denotes a dangling bond that bonds to an oxygen atom in the repeating unit represented by Formula (1b) or (1c). $R^1$ in Formula (1c) represents a group containing an ionic functional group. The ionic functional group in the group containing an ionic functional group is preferably an amino group, a carboxy group, a phenolic hydroxy group, or a silanol group.

Modified silicone oils in which ionic functional groups are introduced into terminal groups have a first terminal group represented by the following Formula (2a), a repeating unit represented by the following Formula (2b), and a second terminal group represented by the following Formula (2c).

[Chem. 2]

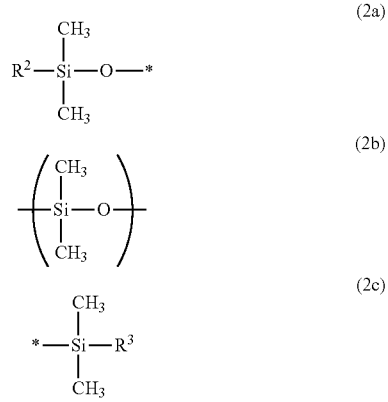

* in Formula (2a) denotes a dangling bond that bonds to a silicon atom in the repeating unit represented by Formula (2b). * in Formula (2c) denotes a dangling bond that bonds to an oxygen atom in the repeating unit represented by Formula (2b). $R^2$ in Formula (2a) and $R^3$ in Formula (2c) each independently represent a group containing an ionic functional group. The ionic functional group in the group containing an ionic functional group is preferably an amino group, a carboxy group, a phenolic hydroxy group, or a silanol group.

The ionic functional group-containing silicone oil preferably includes at least one selected from the group consisting of an amino-modified silicone oil, a carboxy-modified silicone oil, a phenol-modified silicone oil, and a silanol-modified silicone oil. Furthermore, the ionic functional group-containing silicone oil is more preferably at least one selected from the group consisting of these. The ionic functional group-containing silicone oil is more preferably one of these. An amino-modified silicone oil, a carboxy-modified silicone oil, a phenol-modified silicone oil, and a silanol-modified silicone oil have an amino group, a carboxy group, a phenolic hydroxy group, and a silanol group as an ionic functional group, respectively. Among these, the ionic functional group-containing silicone oil is more preferably a carboxy-modified silicone oil.

In a case of containing at least an ionic functional group-containing silicone oil as the silicone oil, it is preferable that the functional group equivalent of the ionic functional group-containing silicone oil is 1000 g/mol or more and 5500 g/mol or less in order to more suitably disperse emulsified particles in an aqueous medium. The functional group equivalent is the molecular weight per 1 mol of functional group (ionic functional group). The functional group equivalent of the ionic functional group-containing silicone oil is, for example, within the range of two values selected from the group consisting of 1000 g/mol, 1200 g/mol, 1474 g/mol, 1490 g/mol, 1500 g/mol, 2000 g/mol, 3800 g/mol, 3900 g/mol, 4000 g/mol, 5000 g/mol, 5200 g/mol, and 5500 g/mol.

In a case of containing at least an ionic functional group-containing silicone oil as the silicone oil, the percentage content of the ionic functional group-containing silicone oil with respect to the total mass of silicone oils contained in the emulsified particles is preferably 30% by mass or more and 100% by mass or less, more preferably 40% by mass or more and 100% by mass or less, particularly preferably 100% by mass.

(Another Silicone Oil)

The silicone oil contained in the treatment liquid may be only another silicone oil. Alternatively, as another silicone oil is further contained in addition to an ionic functional group-containing silicone oil, the viscosity of silicone oil can be adjusted. Examples of another silicone oil include unmodified silicone oil. More specific examples thereof include dimethylpolysiloxane.

In a case where another silicone oil is contained, the percentage content of another silicone oil with respect to the total mass of silicone oils contained in the emulsified particles is preferably 50% by mass or more and 100% by mass or less, more preferably 50% by mass or more and 70% by mass or less, still more preferably 50% by mass or more and 60% by mass or less.

In a case where the silicone oil contained in the treatment liquid contains both an ionic functional group-containing silicone oil and another silicone oil, the silicone oil is preferably a combination of a carboxy-modified silicone oil and dimethylpolysiloxane. In this case, both a carboxy-modified silicone oil and dimethylpolysiloxane may be contained in one kind of emulsified particles. Alternatively, a carboxy-modified silicone oil may be contained in the first emulsified particles and dimethylpolysiloxane may be contained in the second emulsified particles, which are another kind of emulsified particles.

In a case where the silicone oil contained in the treatment liquid contains both an ionic functional group-containing silicone oil and another silicone oil, the ratio of the mass of the ionic functional group-containing silicone oil to the mass of the other silicone oil is preferably 0.5 or more and less than 1.0, more preferably 0.6 or more and 0.7 or less.

<Aqueous Medium>

The aqueous medium contained in the treatment liquid is a medium containing water as a main component. The aqueous medium may function as a solvent or as a dispersion medium. Specific examples of the aqueous medium include water or a mixture of water and a polar solvent. Examples of the polar solvent contained in the aqueous medium include methanol, ethanol, isopropyl alcohol, butanol, and methyl ethyl ketone. The percentage content of water in the aqueous medium is preferably 90% by mass or more, particularly preferably 100% by mass. The percentage content of the aqueous medium is preferably 50% by mass or more and 90% by mass or less, more preferably 55% by mass or more and 70% by mass or less with respect to the mass of the treatment liquid.

<Other Components>

The treatment liquid may contain components (hereinafter, sometimes referred to as other components) other than the emulsified particles and the aqueous medium, if necessary. Examples of the other components include acids, bases, polyols, and dispersants.

(Acid)

In a case where at least an ionic functional group-containing silicone oil is contained as the silicone oil, and the ionic functional group-containing silicone oil has an anionic functional group, it is preferable that the treatment liquid contains an acid. The ionization of the anionic functional groups is promoted by the acid, and the emulsified particles containing the ionic functional group-containing silicone oil are suitably dispersed in the aqueous medium. Examples of the acid include strong acids and weak acids.

Examples of the strong acids include hydrochloric acid, p-toluenesulfonic acid, and sulfuric acid. Examples of the weak acids include benzoic acid and acetic acid. A strong acid is preferable as the acid in order to promote the ionization of anionic functional groups of the silicone oil. Specifically, hydrochloric acid, p-toluenesulfonic acid, or sulfuric acid is more preferable. In a case where the treatment liquid contains an acid, the percentage content of the acid in terms of the amount of acid at a concentration of 1 mol/L is preferably 1% by mass or more and 5% by mass or less with respect to the mass of the treatment liquid.

(Base)

In a case where at least an ionic functional group-containing silicone oil is contained as the silicone oil, and the ionic functional group-containing silicone oil has a cationic functional group, it is preferable that the treatment liquid contains a base. The ionization of the cationic functional groups is promoted by the base, and the emulsified particles containing the ionic functional group-containing silicone oil are suitably dispersed in the aqueous medium. Examples of the base include sodium hydroxide. In a case where the treatment liquid contains a base, the percentage content of the base in terms of the amount of base at a concentration of 1 mol/L is preferably 1% by mass or more and 5% by mass or less with respect to the mass of the treatment liquid.

(Polyol)

When the treatment liquid contains a polyol, the viscosity of the treatment liquid is suitably adjusted. As the polyol, diols or triols are preferable. Examples of the diols include glycol compounds. More specific examples thereof include ethylene glycol, propylene glycol, diethylene glycol, triethylene glycol, and tetraethylene glycol. Examples of the triols include glycerin. In a case where the treatment liquid contains a polyol, the percentage content of polyol is preferably 10% by mass or more and 40% by mass or less, more preferably 15% by mass or more and 35% by mass or less with respect to the mass of the treatment liquid.

(Dispersant)

Examples of dispersants include surfactants, resin dispersants, and polysaccharides. However, it is preferable that the emulsified particles are dispersed in the treatment liquid, which does not contain a dispersant. As already described, emulsified particles containing a silicone oil, particularly an ionic functional group-containing silicone oil are more suitably dispersed in an aqueous medium. Therefore, the dispersed state of emulsified particles can be suitably maintained in a case where a dispersant is not contained as well. Dispersants often have hydrophilic groups. When a dispersant having a hydrophilic group is not contained in the treatment liquid, the color fastness to wet rubbing of the textile printing article processed with the treatment liquid is further improved.

<Method for Producing Treatment Liquid>

An example of a method for producing a treatment liquid will be described. Using a homogenizer, a silicone oil, an aqueous medium, and components (for example, acid or base and polyol) added if necessary are mixed together and emulsified. Thus, emulsified particles containing a silicone oil are dispersed in the aqueous medium to obtain a treatment liquid.

In order to facilitate emulsification, a raw material emulsion containing emulsified particles may be produced in advance, and the raw material emulsion, an aqueous medium, and a polyol if necessary may be mixed together to obtain a treatment liquid. The raw material emulsion contains, for example, a silicone oil, a portion of aqueous medium, and an acid or base if necessary. In the production of raw material emulsion, the emulsification time is, for example, 5 minutes or more and 1 hour or less. The emulsification temperature is, for example, 5° C. or more and 40° C. or less. The percentage content of raw material emulsion is, for example, 15% by mass or more and 50% by mass or less with respect to the mass of the treatment liquid.

In a case where two or more kinds of silicone oils, for example, both an ionic functional group-containing silicone oil and an unmodified silicone oil are used as raw materials, the two silicone oils may be mixed and emulsified to fabricate emulsified particles containing both the ionic functional group-containing silicone oil and the unmodified silicone oil, and a treatment liquid may be obtained. Alternatively, by mixing a raw material emulsion of an ionic functional group-containing silicone oil and a raw material emulsion of an unmodified silicone oil, a treatment liquid may be obtained in which first emulsified particles containing an ionic functional group-containing silicone oil and separate second emulsified particles containing an unmodified silicone oil are present together.

Second Embodiment: Inkjet Textile Printing Apparatus

Next, an inkjet textile printing apparatus 10 according to a second embodiment of the present disclosure will be described with reference to FIG. 1. For ease of understanding, FIG. 1 schematically illustrates mainly the respective constituents. The size, number, and the like of each illustrated constituent may be changed as appropriate. FIG. 1 is a side view illustrating the main part of the inkjet textile printing apparatus 10, which is an example of the inkjet textile printing apparatus according to the second embodiment. The inkjet textile printing apparatus 10 illustrated in FIG. 1 is a flatbed type inkjet textile printing apparatus.

The inkjet textile printing apparatus 10 according to the second embodiment processes a textile printing target P using the treatment liquid according to the first embodiment. Since the treatment liquid according to the first embodiment is used, for the same reason as that described in the first embodiment, according to the inkjet textile printing apparatus 10, a textile printing article excellent in the color fastness to rubbing can be fabricated and deterioration in the texture of textile printing article can be suppressed. Furthermore, since the treatment liquid according to the first embodiment is excellent in ejectability from the processing head, according to the inkjet textile printing apparatus according to the second embodiment, these effects can be exerted reliably.

The inkjet textile printing apparatus 10 illustrated in FIG. 1 comprises a recording head 1, a processing head 2, and a mounting table 3. The recording head 1 comprises a first recording head 1a, a second recording head 1b, a third recording head 1c, and a fourth recording head 1d.

The recording head 1 ejects ink onto the image forming region of the textile printing target P. The first recording head 1a, second recording head 1b, third recording head 1c, and fourth recording head 1d of the recording head 1 eject inks of different colors (for example, yellow ink, magenta ink, cyan ink, and black ink), respectively. The recording head 1 is not particularly limited, but examples thereof include a piezo printhead and a thermal inkjet printhead.

The processing head 2 ejects a treatment liquid onto at least the image forming region of the textile printing target P. The treatment liquid is the treatment liquid according to the first embodiment. The processing head 2 is not particularly limited, but examples thereof include a piezo printhead and a thermal inkjet printhead.

The textile printing target P is placed on the mounting table 3. The recording head 1 and the processing head 2 are arranged above the mounting table 3 so that the ink and treatment liquid can be ejected onto the textile printing target P. Driven by a motor (not illustrated), the mounting table 3 moves horizontally in a direction (for example, leftward in FIG. 1) from the recording head 1 toward the processing head 2. The textile printing target P on the mounting table 3 is conveyed as the mounting table 3 moves horizontally.

The textile printing target P may be a woven fabric or a knitted fabric. Examples of the textile printing target P include cotton cloth, silk cloth, linen cloth, acetate cloth, rayon cloth, nylon cloth, polyurethane cloth, and polyester cloth.

In the fabrication of textile printing article, first, the mounting table 3 on which the textile printing target P is placed horizontally moves, and the textile printing target P is conveyed to a position facing the recording head 1. Ink is ejected from the recording head 1 onto the image forming region of the textile printing target P. In this way, an image is formed in the image forming region of the textile printing target P with ink. After ink is ejected, the mounting table 3 on which the textile printing target P is placed further moves horizontally, and the textile printing target P is conveyed to a position facing the processing head 2. The treatment liquid is ejected from the processing head 2 onto at least the image forming region of the textile printing target P. In this way, a processing film is formed with the treatment liquid on the image formed in the image forming region of the textile printing target P.

The processing head 2 may eject the treatment liquid only onto the image forming region of the textile printing target P. Alternatively, the processing head 2 may eject the treatment liquid onto a region wider than the image forming region of the textile printing target P or may eject the treatment liquid onto the entire surface of the textile printing target P. In order to reduce the amount of treatment liquid used and suppress deterioration in the texture of textile printing article, it is preferable that the processing head 2 ejects the treatment liquid only onto the image forming region of the textile printing target P. For the same reason, it is more preferable that the processing head 2 ejects the treatment liquid only onto the region where ink has been ejected by the recording head 1 among the image forming regions. Since the processing head 2 can accurately control the position where the treatment liquid is ejected, it is possible to eject the treatment liquid only onto the region where ink has been ejected. In order to accurately control the position where the treatment liquid is ejected, it is preferable that the distance between the processing head 2 and the textile printing target P is 1 mm or more and 5 mm or less. In order to efficiently proceed with the post-processing using the treatment liquid, it is preferable that only the treatment liquid is ejected from the processing head 2.

After the treatment liquid is ejected from the processing head 2 onto the textile printing target P, the mounting table 3 on which the textile printing target P is placed further moves horizontally, and the textile printing target P is conveyed to a position facing the heating unit (not illustrated). The heating unit heats the textile printing target P to dry the ink and treatment liquid. The heating temperature is, for example, 120° C. or more and 180° C. or less. The heating time is, for example, 1 minute or more and 10 minutes or less. By heating, the volatile components contained in the ink and treatment liquid evaporate, and fixation of the ink and treatment liquid to the textile printing target P is promoted. As a result, a textile printing article is fabricated, which is a textile printing target P subjected to image formation with ink and processing with a treatment liquid.

The inkjet textile printing apparatus 10 according to the second embodiment has been described above. However, the inkjet textile printing apparatus of the present disclosure is not limited to the inkjet textile printing apparatus 10, and can be modified, for example, as shown in the following modified examples.

Regarding the first modified example, the inkjet textile printing apparatus 10 may include a spray for spraying the treatment liquid instead of the processing head 2 for ejecting the treatment liquid.

Regarding the second modified example, the processing with the treatment liquid may be carried out by immersing the textile printing target P in a tank in which the treatment liquid is stored. In the case of immersion, the amount of the treatment liquid ejected described later in the third embodiment corresponds to the amount of the treatment liquid applied.

Regarding the third modified example, the recording head 1 and the processing head 2 may move horizontally in a state where the mounting table 3 is fixed although the mounting table 3 moves horizontally in the above-described embodiment.

Regarding the fourth modified example, the recording head 1 and the processing head 2 may move horizontally in a direction perpendicular to the direction in which the textile printing target P is conveyed as well as the mounting table 3 moves horizontally or the recording head 1 and the processing head 2 move horizontally in the direction in which the textile printing target P is conveyed.

Regarding the fifth modified example, the number of recording heads 1 may be 1 to 3 or 5 or more.

Regarding the sixth modified example, the inkjet textile printing apparatus may be an inkjet textile printing apparatus that is not a flatbed type. The effects by the use the treatment liquid according to the first embodiment can be obtained regardless of the type of inkjet textile printing apparatus as long as the inkjet textile printing apparatus includes the recording head 1 and the processing head 2.

Third Embodiment: Inkjet Textile Printing Method

Next, an inkjet textile printing method according to a third embodiment of the present disclosure will be described while continuing to refer to FIG. 1. In the inkjet textile printing method according to the third embodiment, an image is formed in the image forming region of the textile printing target P using the treatment liquid according to the first embodiment. In the inkjet textile printing method according to the third embodiment, an image is formed in the image forming region of the textile printing target P using the inkjet textile printing apparatus 10 according to the second embodiment. In the inkjet textile printing method according to the third embodiment, since the treatment liquid according to the first embodiment is used, for the same reason as that described in the first embodiment, a textile printing article excellent in the color fastness to rubbing can be fabricated and deterioration in the texture of textile printing article can be suppressed. Furthermore, since the treatment liquid according to the first embodiment is excellent in ejectability from the processing head, according to the inkjet textile printing method according to the third embodiment, these effects can be exerted reliably.

An inkjet textile printing method according to the third embodiment includes ejecting ink and ejecting treatment liquid. In the ejecting ink, ink is ejected from the recording head 1 onto the image forming region of the textile printing target P. In the ejecting treatment liquid, the treatment liquid is ejected from the processing head 2 onto at least the image forming region of the textile printing target P. The treatment liquid is the treatment liquid according to the first embodiment. The ejecting treatment liquid is performed, for example, after the ejecting ink. The inkjet textile printing method may further include a heating step, if necessary.

In the ejecting ink, the amount of ink ejected onto the textile printing target P is, for example, 5 g/m$^2$ or more and 40 g/m$^2$ or less.

In the ejecting treatment liquid, the amount of treatment liquid ejected to the textile printing target P also depends on the kind of silicone oil, but is, for example, 10 g/m$^2$ or more and 120 g/m$^2$ or less (including the case of application). In the ejecting treatment liquid, the amount of treatment liquid ejected is preferably 5 g/m$^2$ or more and 30 g/m$^2$ or less in a case where the treatment liquid is ejected from the processing head 2 to the textile printing target P. By setting the amount of treatment liquid ejected to be within the range of 5 g/m$^2$ or more and 30 g/m$^2$ or less, a textile printing article excellent in both the color fastness to dry rubbing and the color fastness to wet rubbing can be fabricated more reliably.

The amount of treatment liquid ejected also depends on the kind of silicone oil, but is more preferably 5 g/m$^2$ or more and 20 g/m$^2$ or less, still more preferably 5 g/m$^2$ or more and 10 g/m$^2$ or less. By adjusting the amount of treatment liquid ejected to such a range, a textile printing article superior in terms of both the color fastness to dry rubbing and the color fastness to wet rubbing can be fabricated in the case of using the inkjet treatment liquid according to the first embodiment in which the percentage content of silicone oil is 7% by mass or more and 15% by mass or less. In particular, in the case of containing at least a carboxy-modified silicone oil as the silicone oil, the effect of remarkably improving the color fastness to rubbing can be exerted more reliably in the above range of the amount of treatment liquid ejected. The inkjet textile printing method according to the third embodiment has been described above with reference to FIG. 1.

Ink Used in Second Embodiment and Third Embodiment

Next, ink used in the second embodiment and third embodiment will be described. The ink contains, for example, a pigment and an aqueous medium. The ink may further contain at least one selected from the group consisting of surfactants, polyols, and binder resin particles, if necessary.

(Pigment)

The pigment is present, for example, in a state of being dispersed in an aqueous medium. From the viewpoint of obtaining ink excellent in image density, hue, and color stability, $D_{50}$ of the pigment is preferably 30 nm or more and 250 nm or less, more preferably 70 nm or more and 160 nm or less.

Examples of the pigment include yellow pigments, orange pigments, red pigments, blue pigments, purple pigments, and black pigments. Examples of the yellow pigments include C.I. Pigment Yellow (74, 93, 95, 109, 110, 120, 128, 138, 139, 151, 154, 155, 173, 180, 185, and 193). Examples of the orange pigments include C.I. Pigment Orange (34, 36, 43, 61, 63, and 71). Examples of the red pigments include C.I. Pigment Red (122 and 202). Examples of the blue pigments include C.I. Pigment Blue (15, more specifically 15:3). Examples of the purple pigments include C.I. Pigment Violet (19, 23, and 33). Examples of the black pigments include C.I. Pigment Black (7).

The percentage content of pigment is preferably 1% by mass or more and 12% by mass or less, more preferably 1% by mass or more and 7% by mass or less with respect to the mass of the ink. When the percentage content of pigment is 1% by mass or more, the image density of the textile printing article to be fabricated can be improved. When the percentage content of pigment is 12% by mass or less, ink exhibiting high fluidity can be obtained.

(Aqueous Medium)

The aqueous medium contained in the ink is synonymous with the aqueous medium contained in the treatment liquid described in the first embodiment. The percentage content of the aqueous medium is preferably 5% by mass or more and 70% by mass or less, more preferably 40% by mass or more and 60% by mass or less with respect to the mass of the ink.

(Surfactant)

When the ink contains a surfactant, the wettability of the ink to the textile printing target is improved. Examples of the surfactant include anionic surfactants, cationic surfactants, nonionic surfactants, and amphoteric surfactants. The surfactant contained in the ink is preferably a nonionic surfactant. The nonionic surfactant is preferably a surfactant having an acetylene glycol structure, more preferably an acetylene diol ethylene oxide adduct. The HLB value of the surfactant is preferably 3 or more and 20 or less, more preferably 6 or more and 16 or less, still more preferably 7 or more and 10 or less. The HLB value of a surfactant is calculated, for example, from the formula "HLB value=20× (sum of formula weights of hydrophilic moieties)/molecular weight" by the Griffin's method. In order to improve image density while suppressing image offset, the percentage content of surfactant is preferably 0.1% by mass or more and 5.0% by mass or less, more preferably 0.5% by mass or more and 2.0% by mass or less with respect to the mass of the ink.

(Polyol)

When the ink contains a polyol, the viscosity of the ink is suitably adjusted. The polyol contained in the ink is synonymous with the polyol contained in the treatment liquid described in the first embodiment. In a case where the ink contains a polyol, in order to suitably adjust the viscosity of the ink, the percentage content of polyol is preferably 5% by mass or more and 60% by mass or less, more preferably 20% by mass or more and 50% by mass or less with respect to the mass of the ink.

(Binder Resin Particles)

The binder resin particles are present in a state of being dispersed in an aqueous medium. The binder resin particles function as a binder that binds the textile printing target and the pigment to each other. Therefore, when the ink contains binder resin particles, a textile printing article excellent in pigment fixability can be obtained.

Examples of resin contained in the binder resin particles include urethane resins, (meth)acrylic resins, styrene-(meth) acrylic resins, styrene-maleic acid copolymers, vinylnaphthalene-(meth)acrylic acid copolymers, and vinylnaphthalene-maleic acid copolymers. A urethane resin is preferable as the resin contained in the binder resin particles. The percentage content of urethane resin in the binder resin particles is preferably 80% by mass or more, more preferably 100% by mass.

The percentage content of binder resin is preferably 1% by mass or more and 20% by mass or less, more preferably 2% by mass or more and 10% by mass or less with respect to the mass of the ink. When the percentage content of binder resin particles is 1% by mass or more, a textile printing target excellent in pigment fixability can be obtained. Meanwhile, when the percentage content of binder resin particles is 20% by mass or less, the ink can be stably ejected onto the textile printing target.

(Additive)

The ink may further contain known additives (more specifically, dissolution stabilizers, drying inhibitors, antioxidants, viscosity modifiers, pH modifiers, antifungal agents, and the like), if necessary.

(Method for Producing Ink)

The ink is produced by, for example, mixing a pigment, an aqueous medium, and components (for example, surfactant, polyol, and binder resin particles) added if necessary using a stirrer. The mixing time is, for example, 1 minute or more and 30 minutes or less.

Summary of Present Disclosure

An inkjet treatment liquid according to a first aspect of the present disclosure comprise emulsified particles containing a silicone oil and an aqueous medium, wherein a percentage content of the silicone oil is 7% by mass or more and 15% by mass or less.

This inkjet treatment liquid can suppress deterioration in the texture of textile printing article, can fabricate a textile printing article excellent in the color fastness to rubbing, and is excellent in ejectability from the processing head of an inkjet textile printing apparatus.

In the above-described inkjet treatment liquid, the percentage content of silicone oil may be 10% by mass or more and 13% by mass or less.

As the percentage content of silicone oil is 10% by mass or more and 13% by mass or less, a textile printing article superior in both the color fastness to wet rubbing and the color fastness to dry rubbing can be fabricated.

In the inkjet treatment liquid described above, the silicone oil may include at least an ionic functional group-containing silicone oil.

By containing at least an ionic functional group-containing silicone oil, a textile printing article more superior in the color fastness to wet rubbing can be fabricated.

In the above-described inkjet treatment liquid, the inkjet treatment liquid may be for textile printing.

By using the above-described inkjet treatment liquid for textile printing, the effect of suppressing deterioration in the texture of textile printing article and the effect of excellent color fastness to rubbing can be exerted more effectively.

An inkjet textile printing apparatus according to a second aspect of the present disclosure comprises a recording head configured to eject ink onto an image forming region of a textile printing target and a processing head configured to eject a treatment liquid onto at least the image forming region of the textile printing target, wherein the treatment liquid is the inkjet treatment liquid according to the first aspect of the present disclosure.

In this inkjet textile printing apparatus, since the inkjet treatment liquid according to the first aspect of the present disclosure is used, a textile printing article in which deterioration in texture is suppressed can be fabricated and a textile printing article excellent in the color fastness to rubbing can be fabricated. Furthermore, since the inkjet treatment liquid is excellent in ejectability from the processing head, the effect of the inkjet treatment liquid according to the first aspect of the present disclosure on a textile printing article can be reliably exerted.

An inkjet textile printing method according to a third aspect of the present disclosure wherein an ejecting ink from a recording head onto an image forming region of a textile printing target and an ejecting a treatment liquid from a processing head onto at least the image forming region of the textile printing target, wherein the treatment liquid is the inkjet treatment liquid according to the first aspect of the present disclosure.

In the inkjet textile printing method, since the inkjet treatment liquid according to the first aspect of the present disclosure is used, a textile printing article in which deterioration in texture is suppressed can be fabricated and a textile printing article excellent in the color fastness to rubbing can be fabricated. Furthermore, since the inkjet treatment liquid is excellent in ejectability from the processing head, the effect of the inkjet treatment liquid according to the first aspect of the present disclosure on a textile printing article can be reliably exerted.

In the inkjet textile printing method described above, an amount of inkjet treatment liquid ejected may be 5 $g/m^2$ or more and 30 $g/m^2$ or less.

According to the inkjet textile printing method having this configuration, a textile printing article excellent in the color fastness to rubbing can be fabricated more reliably.

In the inkjet textile printing method, the amount of inkjet treatment liquid ejected may be 5 $g/m^2$ or more and 10 $g/m^2$ or less.

According to the inkjet textile printing method having this configuration, a textile printing article excellent in the color fastness to rubbing can be fabricated still more reliably.

EXAMPLES

Hereinafter, the present disclosure will be described more specifically with reference to Examples, but the present disclosure is not limited by Examples at all.

In the present Examples, various textile printing articles were fabricated while varying the kind of inkjet treatment liquid (specifically, the kind and percentage content of silicone oil in the treatment liquid) and the amount of treatment liquid ejected. Then, the color fastness to rubbing and suppression of deterioration in the texture of textile printing articles were evaluated. Furthermore, in the present Examples, the ejectability of the treatment liquid from the nozzle according to the percentage content of silicone oil in the inkjet treatment liquid was also evaluated.

1. Evaluation test of color fastness to rubbing and suppression of deterioration in texture of textile printing article when kind of treatment liquid (kind and percentage content of silicone oil in treatment liquid) is varied In this test, the amount of treatment liquid ejected during fabrication of textile printing articles was set to 20 $g/m^2$, and various textile printing articles were fabricated while changing the kind and percentage content of silicone oil in the treatment liquid. Thereafter, the color fastness to rubbing and suppression of deterioration in texture of various textile printing articles fabricated were evaluated.

[Method for Preparing Treatment Liquid]

The treatment liquids (A-1) to (A-6) and treatment liquids (B-1) and (B-2) used in this evaluation test were prepared by the method described below. The percentage content of silicone oil was calculated by rounding off to the first decimal place.

<Preparation of Treatment Liquid (A-1)>

First, a raw material emulsion A to be contained in a treatment liquid (A-1) was prepared. Specifically, 300 g of amino-modified silicone oil ("KF-864" manufactured by Shin-Etsu Chemical Co., Ltd., viscosity: 1,700 mm$^2$/s, specific gravity: 0.98, functional group equivalent: 3,800 g/mol), 600 g of ion exchanged water, and 100 g of hydrochloric acid (concentration: 1 mol/L) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion A. Emulsified particles containing an amino-modified silicone oil were dispersed in the raw material emulsion A. The average particle size of the emulsified particles contained in the raw material emulsion A was 150 nm.

Next, a treatment liquid (A-1) was prepared using the raw material emulsion A prepared as described above. Specifically, 33.30 g of raw material emulsion A (percentage content of amino-modified silicone oil: 30% by mass and content of amino-modified silicone oil: 9.99 g), 33.35 g of ion exchanged water, and 33.35 g of propylene glycol were mixed together to obtain a treatment liquid (A-1). In the treatment liquid (A-1), the percentage content of amino-modified silicone oil was 10% by mass.

<Preparation of Treatment Liquid (A-2)>

In the preparation of treatment liquid (A-2), the raw material emulsion A prepared as described above was used. Specifically, 50.00 g of raw material emulsion A (percentage content of amino-modified silicone oil: 30% by mass and content of amino-modified silicone oil: 15.00 g), 35.00 g of ion exchanged water, and 15.00 g of propylene glycol were mixed together to obtain a treatment liquid (A-2). In the treatment liquid (A-2), the percentage content of amino-modified silicone oil was 15% by mass.

<Preparation of Treatment Liquid (A-3)>

First, a raw material emulsion B to be contained in a treatment liquid (A-3) was prepared. Specifically, 300 g of carboxy-modified silicone oil ("X-22-3701E" manufactured by Shin-Etsu Chemical Co., Ltd., viscosity: 2,000 mm$^2$/s, specific gravity: 0.98, functional group equivalent: 4,000 g/mol), 600 g of ion exchanged water, and 100 g of sodium hydroxide aqueous solution (concentration: 1 mol/L) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion B. Emulsified particles containing a carboxy-modified silicone oil were dispersed in the raw material emulsion B. The average particle size of the emulsified particles contained in the raw material emulsion B was 120 nm.

Next, the treatment liquid (A-3) was prepared using the raw material emulsion B prepared as described above. Specifically, the treatment liquid (A-3) was obtained in the same manner as the treatment liquid (A-1) except that the raw material emulsion A (percentage content of amino-modified silicone oil: 30% by mass) was changed to the raw material emulsion B (percentage content of carboxy-modified silicone oil: 30% by mass). In the treatment liquid (A-3), the percentage content of carboxy-modified silicone oil was 10% by mass.

<Preparation of Treatment Liquid (A-4)>

First, a raw material emulsion C to be contained in a treatment liquid (A-4) was prepared. Specifically, 300 g of amino-modified silicone oil ("KF-877" manufactured by Shin-Etsu Chemical Co., Ltd., viscosity: 5,700 mm$^2$/s, specific gravity: 0.98, functional group equivalent: 5,200 g/mol), 600 g of ion exchanged water, and 100 g of hydrochloric acid (concentration: 1 mol/L) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion C. Emulsified particles containing an amino-modified silicone oil were dispersed in the raw material emulsion C. The average particle size of the emulsified particles contained in the raw material emulsion C was 200 nm.

Next, the treatment liquid (A-4) was prepared using the raw material emulsion C prepared as described above. Specifically, the treatment liquid (A-4) was obtained in the same manner as the treatment liquid (A-1) except that the raw material emulsion A (percentage content of amino-modified silicone oil: 30% by mass) was changed to the raw material emulsion C (percentage content of amino-modified silicone oil: 30% by mass). In the treatment liquid (A-4), the percentage content of amino-modified silicone oil was 10% by mass.

<Preparation of Treatment Liquid (A-5)>

First, a raw material emulsion D to be contained in a treatment liquid (A-5) was prepared. Specifically, 180 g of unmodified silicone oil (specifically, dimethylpolysiloxane) ("KF96-3000cs" manufactured by Shin-Etsu Chemical Co., Ltd., viscosity: 3,000 mm$^2$/s, specific gravity: 0.97) and 120 g of phenol-modified silicone oil ("KF2201" manufactured by Shin-Etsu Chemical Co., Ltd., viscosity: 97 m$^2$/s, specific gravity: 0.99, functional group equivalent: 1,474 g/mol) were mixed together to obtain a mixture MD having a viscosity of 1,000 mm$^2$/s. Into a beaker, 300 g of mixture MD, 600 g of ion exchanged water, and 100 g of sodium hydroxide aqueous solution (concentration 1 mol/L) were put. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion D. In the raw material emulsion D, emulsified particles containing an unmodified silicone oil and a phenol-modified silicone oil were dispersed. The average particle size of the emulsified particles contained in the raw material emulsion D was 160 nm.

Next, the treatment liquid (A-5) was prepared using the raw material emulsion D prepared as described above. Specifically, the treatment liquid (A-5) was obtained in the same manner as the treatment liquid (A-1) except that the raw material emulsion A (percentage content of amino-modified silicone oil: 30% by mass) was changed to the raw material emulsion D (percentage content of mixture of phenol-modified silicone oil and unmodified silicone oil: 30% by mass). The percentage content of the mixture of phenol-modified silicone oil and unmodified silicone oil in the treatment liquid (A-5) was 10% by mass.

<Preparation of Treatment Liquid (A-6)>

First, a raw material emulsion E to be contained in a treatment liquid (A-6) was prepared. Specifically, 180 g of unmodified silicone oil ("KF96-3000cs" manufactured by Shin-Etsu Chemical Co., Ltd., viscosity: 3,000 mm$^2$/s, specific gravity: 0.97) and 120 g of silanol-modified silicone oil ("KF9701" manufactured by Shin-Etsu Chemical Co., Ltd., viscosity: 60 mm$^2$/s, specific gravity: 0.977, functional group equivalent: 1,500 g/mol) were mixed together to obtain a mixture ME having a viscosity of 1,200 mm²/s. Into a beaker, 300 g of mixture ME, 600 g of ion exchanged water, and 100 g of sodium hydroxide aqueous solution (concentration 1 mol/L) were put. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion E. In the raw material emulsion E, emulsified particles containing an unmodified silicone oil and a silanol-modified silicone oil were dispersed. The average particle size of the emulsified particles contained in the raw material emulsion E was 220 nm.

Next, the treatment liquid (A-6) was prepared using the raw material emulsion E prepared as described above. Specifically, the treatment liquid (A-6) was obtained in the same manner as the treatment liquid (A-1) except that the raw material emulsion A (percentage content of amino-modified silicone oil: 30% by mass) was changed to the raw material emulsion E (percentage content of mixture of silanol-modified silicone oil and unmodified silicone oil: 30% by mass). The percentage content of the mixture of silanol-modified silicone oil and unmodified silicone oil in the treatment liquid (A-6) was 10% by mass.

<Preparation of Treatment Liquid (B-1)>

In the preparation of treatment liquid (B-1), the raw material emulsion A prepared as described above was used. Specifically, 10.00 g of raw material emulsion A (percentage content of amino-modified silicone oil: 30% by mass and content of amino-modified silicone oil: 3.00 g), 55.00 g of ion exchanged water, and 35.00 g of propylene glycol were mixed together to obtain a treatment liquid (B-1). In the treatment liquid (B-1), the percentage content of amino-modified silicone oil was 3% by mass.

<Preparation of Treatment Liquid (B-2)>

In the preparation of treatment liquid (B-2), the raw material emulsion A prepared as described above was used. Specifically, 65.00 g of raw material emulsion A (percentage content of amino-modified silicone oil: 30% by mass and content of amino-modified silicone oil: 19.50 g) and 35.00 g of propylene glycol were mixed together to obtain a treatment liquid (B-2). In the treatment liquid (B-2), the percentage content of amino-modified silicone oil was 20% by mass.

The kinds of raw material emulsions, the kinds and percentage contents of silicone oils, and the viscosities of silicone oils in the treatment liquids (A-1) to (A-6) and treatment liquids (B-1) and (B-2) are summarized in Table 1 below.

TABLE 1

| Kind of treatment liquid | Kind of raw material emulsion | Silicone oil in treatment liquid | | Viscosity [mm²/s] |
|---|---|---|---|---|
| | | Amount [wt %] | Kind | |
| A-1 | A | 10 | Amino-modified silicone oil | 1,700 |
| A-2 | A | 15 | Amino-modified silicone oil | 1,700 |
| A-3 | B | 10 | Carboxy-modified silicone oil | 2,000 |
| A-4 | C | 10 | Amino-modified silicone oil | 5,700 |
| A-5 | D | 10 (Total) | Unmodified silicone oil Phenol-modified silicone oil | 1,000 |
| A-6 | E | 10 (Total) | Unmodified silicone oil Silanol-modified silicone oil | 1,200 |
| B-1 | A | 3 | Amino-modified silicone oil | 1,700 |
| B-2 | A | 20 | Amino-modified silicone oil | 1,700 |

The meaning of each term in Table 1 above and Table 4 shown later is as follows. "Amount" indicates the percentage content of silicone oil in the treatment liquid. "wt %" indicates % by mass. "Viscosity" indicates the viscosity of silicone oil. In a case where the emulsified particles contain two or more kinds of silicone oils, "viscosity" indicates the viscosity of a mixture of the two or more kinds of silicone oils.

As shown in Table 1 above, the treatment liquids (A-1) to (A-6) all contain emulsified particles containing a silicone oil and an aqueous medium. Furthermore, in all of the treatment liquids (A-1) to (A-6), the percentage content of silicone oil is in the range of 7% by mass or more and 15% by mass or less. Meanwhile, the percentage content of silicone oil in the treatment liquid (B-1) is 3% by mass, the percentage content of silicone oil in the treatment liquid (B-2) is 20% by mass, and these percentage contents are out of the range of 7% by mass or more and 15% by mass or less.

[Method for Measuring Each Physical Property]

The average particle size of emulsified particles in raw material emulsions and the viscosity of silicone oil were measured by the methods described below.

<Measurement of Average Particle Size of Emulsified Particles>

The average particle size of emulsified particles was measured in conformity with the method described in ISO 13321:1996 (Particle size analysis-Photon correlation spectroscopy) using a laser diffraction particle size distribution analyzer ("Zetasizer Nano ZS" manufactured by Malvern Panalytical Ltd.). For measurement of the average particle size of emulsified particles, a measurement sample obtained by diluting the treatment liquid 1000-fold with water was used. The average particle size of emulsified particles contained in the raw material emulsion and the average particle size of emulsified particles contained in the treatment liquid are approximately the same as each other.

<Measurement of Viscosity of Silicone Oil>

The viscosity of silicone oil was measured in conformity with the method described in JIS Z8803:2011 (method for measuring viscosity of liquid) in an environment at a temperature of 25° ° C. The Ubbelohde viscometer described in "6.2.3 Ubbelohde viscometer" of JIS Z8803:2011 was used to measure the viscosity of silicone oil.

[Evaluation Method]

Using each of the prepared treatment liquids, the color fastness to rubbing and suppression of deterioration in texture of various textile printing articles were evaluated. Specifically, ink for evaluation was prepared, textile printing articles using the ink for evaluation and the respective treatment liquids were fabricated, and the color fastness to rubbing and suppression of deterioration in texture thereof were evaluated. Hereinafter, the method for preparing the ink for evaluation, the method for fabricating the textile printing articles for evaluation, and various evaluation methods will be described in detail.

<Method for Preparing Ink for Evaluation>

Inks a and b to be used in the evaluation of treatment liquid were prepared by the method shown below.

(Method for Preparing Ink a)

Into a 1 L three-necked flask equipped with a stirring blade, 125 g of ion exchanged water and 2 g of nonionic surfactant ("SURFYNOL (registered trademark) 440" manufactured by Nissin Chemical Industry Co., Ltd., content: acetylene glycol ethylene oxide adduct) were put. While the contents in the flask were stirred, 165 g of propylene glycol, 100 g of black pigment dispersion ("AE2078F" manufactured by SANYO COLOR WORKS, LTD., content: C.I. Pigment Black 7, solid concentration: 20% by mass), and 108 g of binder resin particle dispersion ("SUPERFLEX 470" DKS Co., Ltd., content: polyurethane dispersion, solid concentration: 38% by mass) were sequentially added into the flask. The contents in the flask were stirred for 10 minutes to obtain ink a.

(Method for Preparing Ink b)

Into a 1 L three-necked flask equipped with a stirring blade, 140 g of ion exchanged water and 2 g of nonionic surfactant ("SURFYNOL (registered trademark) 440" manufactured by Nissin Chemical Industry Co., Ltd., content: acetylene glycol ethylene oxide adduct) were put. While the contents in the flask were stirred, 225 g of propylene glycol, 83 g of black pigment dispersion ("ACAK1" manufactured by Dainichiseika Color & Chemicals Mfg. Co., Ltd., content: C.I. Pigment Black 7, solid concentration: 15% by mass), and 50 g of binder resin particle dispersion ("Eternacoll (registered trademark) UW-1527F" manufactured by UBE Corporation, content: polyurethane dispersion, solid concentration: 40% by mass) were sequentially added into the flask. The contents in the flask were stirred for 10 minutes to obtain ink b.

<Method for Fabricating Textile Printing Article for Evaluation>

Textile printing articles for evaluation were fabricated using the inks and treatment liquids shown in Table 2 below. For example, for the evaluation of Example 1-1 in Table 2, the treatment liquid (A-1) and ink a were used.

A cotton broadcloth (manufactured by SHIKISENSHA CO., LTD., size: A4 size, warp and weft cotton yarn number: 40/1, warp density: 130 threads/inch, weft density: 75 threads/inch, basis weight: 122 g/m$^2$) was used as a textile printing target. An inkjet printer ("Colorio (registered trademark) PX-045A" manufactured by Seiko Epson Corporation) was used to fabricate textile printing articles for evaluation. The ink was filled in the first ink chamber of the first cartridge. The treatment liquid was filled in the second ink chamber of the second cartridge. The first cartridge and the second cartridge were loaded into the inkjet printer. The ink filled in the first ink chamber is ejected from the recording head of the inkjet printer. The treatment liquid filled in the second ink chamber is ejected from the processing head of the inkjet printer.

Using an inkjet printer, the ink was ejected from the recording head onto the textile printing target in an amount of ink ejected of 20 g/m$^2$ to form a solid image of ink. Next, using the inkjet printer, the treatment liquid was ejected from the processing head onto the textile printing target so that the amount of treatment liquid ejected was 20 g/m$^2$ as described above. In this way, a processing film having the same size as that of the solid image was formed on the solid image of ink with the treatment liquid. Next, the textile printing target was heated at 160° C. for 3 minutes to dry the ink and treatment liquid, thereby obtaining a textile printing article for evaluation.

<Evaluation of Color Fastness to Rubbing>

According to the dry test and wet test by the rubbing tester type II (Gakushin type) method described in JIS L-0849: 2013 (test method for color fastness to rubbing), the solid image formed on the textile printing article for evaluation was rubbed with a white cotton cloth for rubbing. In conformity with the "criteria for discoloration and fading" described in Clause 10 (determination of color fastness to rubbing) of JIS L-0801: 2011 (general rules for test method for color fastness to rubbing), the degree of coloration of the white cotton cloth for rubbing, after rubbing was evaluated. The degree of coloration of the white cotton cloth for rubbing was determined on a nine grade scale (grade 1, grade 1 to 2, grade 2, grade 2 to 3, grade 3, grade 3 to 4, grade 4, grade 4 to 5, and grade 5 in descending order of degree of contamination). The color fastness to rubbing is more favorable as the degree of coloration of the white cotton cloth for rubbing is smaller (closer to grade 5). From the degree of coloration of the white cotton cloth for rubbing after the rubbing test, the color fastness to dry rubbing and the color fastness to wet rubbing were evaluated according to the following criteria. The determination result of the dry test was taken as the color fastness to dry rubbing, and the determination result of the wet test was taken as the color fastness to wet rubbing. The case where the evaluation was A or B was determined as pass, and the case where the evaluation was C was determined as failure. The determined color fastness to rubbing and the evaluation results thereof are summarized in Table 2 below.

(Evaluation Criteria for Color Fastness to Dry Rubbing)

Evaluation A: color fastness to dry rubbing is grade 4 or more.

Evaluation B: color fastness to dry rubbing is grade 3 to 4.

Evaluation C: color fastness to dry rubbing is grade 3 or less.

(Evaluation Criteria for Color Fastness to Wet Rubbing)

Evaluation A: color fastness to wet rubbing is grade 3 or more.

Evaluation B: color fastness to wet rubbing is grade 2 to 3.

Evaluation C: color fastness to wet rubbing is grade 2 or less.

<Evaluation on Suppression of Deterioration in Texture>

The unused textile printing target was folded in two along the warp (the longitudinal direction) and the distance (loop height) between the lower and upper cloth at the crease was measured. The measured loop height of the unused textile printing target was taken as the loop height before textile printing. Next, the region on which the solid image was formed of the textile printing article for evaluation was folded in two along the warp (the longitudinal direction), and the loop height was measured. The measured loop height of the textile printing article for evaluation was taken as the loop height after textile printing. The rate of change in loop height (unit: %) after textile printing was calculated according to the formula "change rate of loop height=100× loop height after textile printing/loop height before textile printing". It indicates that the deterioration in the texture of textile printing article is further suppressed as the rate of change in loop height is lower since the textile printing target is not stiffened and does not swell even after textile printing. It was evaluated whether the deterioration in the texture of textile printing article was suppressed from the rate of change in loop height according to the following criteria. The case where the evaluation was A or B was determined as pass, and the case where the evaluation was C was determined as failure. The measured rate of change in loop height and the evaluation results regarding suppression of deterioration in texture are summarized in Table 2 below.

(Evaluation Criteria for Suppression of Deterioration in Texture)

Evaluation A: Rate of change in loop height is 125% or less.

Evaluation B: Rate of change in loop height is more than 125% and 130% or less.

Evaluation C: Rate of change in loop height is more than 130%.

TABLE 2

| | Kind of treatment liquid | Ink | Color fastness to rubbing | | | | Texture | |
|---|---|---|---|---|---|---|---|---|
| | | | Dry | | Wet | | | |
| | | | Grade | Evaluation | Grade | Evaluation | Height [%] | Evaluation |
| Example 1-1 | A-1 | a | 4 | A | 3 | A | 110 | A |
| Example 1-2 | A-2 | a | 4-5 | A | 2-3 | B | 105 | A |
| Example 1-3 | A-3 | a | 4 | A | 3-4 | A | 115 | A |
| Example 1-4 | A-4 | a | 4-5 | A | 3 | A | 120 | A |
| Example 1-5 | A-5 | a | 4 | A | 2-3 | B | 115 | A |
| Example 1-6 | A-6 | a | 4 | A | 2-3 | B | 110 | A |
| Example 1-7 | A-1 | b | 4 | A | 3 | A | 110 | A |
| Comparative Example 1-1 | B-1 | a | 3 | C | 3 | A | 135 | C |
| Comparative Example 1-2 | B-2 | a | 4-5 | A | 2 | C | 100 | A |

The meaning of each term in Table 2 above and Table 3 shown below is as follows. "Texture" indicates the evaluation regarding suppression of deterioration in the texture of textile printing article. "Height" indicates the rate of change in loop height after textile printing. "1 to 2", "2 to 3", "3 to 4" and "4 to 5" in the column of color fastness to rubbing indicate grades 1 to 2, 2 to 3, 3 to 4 and 4 to 5 of the degree of coloration of the white cotton cloth for rubbing, respectively.

DISCUSSION

As shown in Table 2 above, the color fastness to dry rubbing, color fastness to wet rubbing, and suppression of deterioration in the texture of textile printing articles fabricated using the treatment liquids (A-1) to (A-6) were all evaluated as A or B regardless of the kind of ink. On the other hand, at least one of the color fastness to dry rubbing, color fastness to wet rubbing, or suppression of deterioration in the texture of textile printing articles fabricated using the treatment liquids (B-1) and (B-2) was evaluated as C. Hence, according to the inkjet treatment liquid of the present embodiment, including the treatment liquids (A-1) to (A-6), it is determined that a textile printing article excellent in the color fastness to rubbing can be fabricated and deterioration in the texture of textile printing article can be suppressed.

2. Evaluation Test of Color Fastness to Rubbing and Suppression of Deterioration in Texture of Textile Printing Article when Amount of Treatment Liquid Ejected is Varied In this test, the above-described treatment liquid (A-1) was used as the inkjet treatment liquid, various textile printing articles for evaluation were fabricated while varying the amount of treatment liquid ejected, and the color fastness to rubbing and suppression of deterioration in the texture of textile printing articles for evaluation were evaluated.

<Method for Fabricating Textile Printing Articles for Evaluation of Examples 1-1, 1-8 to 1-10, and 1-7>

Regarding the fabrication of textile printing articles for evaluation of Examples 1-1, 1-8 to 1-10, and 1-7, textile printing articles for evaluation were fabricated by the same method as the method for fabricating a textile printing article for evaluation described in 1. above, except that the following points were changed. Specifically, the ink shown in Table 3 later was filled in the first ink chamber of the first cartridge, and the treatment liquid (A-1) was filled in the second ink chamber of the second cartridge. In each Example, the amount of treatment liquid ejected was set to the ejected amount shown in Table 3 later. The amount of ink ejected was not changed from 20 g/m$^2$.

<Method for Fabricating Textile Printing Article for Evaluation of Example 1-11>

Regarding the fabrication of textile printing article of Example 1-11, a textile printing target on which a solid image of ink was formed was fabricated by the same method as the method for fabricating a textile printing article for evaluation described in 1, above, except that the following points were changed. Specifically, the ink shown in Table 3 later was filled in the first ink chamber of the first cartridge, and the treatment liquid was not filled in the second ink chamber of the second cartridge. In other words, the amount of treatment liquid ejected was set to 0 g/m$^2$ and the treatment liquid was not ejected from the processing head. The amount of ink ejected was not changed from 20 g/m$^2$.

Next, the textile printing target on which a solid image of ink was formed was impregnated with the treatment liquid (A-1), then taken out from the treatment liquid (A-1), and lightly squeezed. For detail, the textile printing target was squeezed so that the pickup rate was 100% and the amount of treatment liquid (A-1) applied was 120 g/m$^2$. The squeezed textile printing target was heated at 160° ° C. for 3 minutes to dry the ink and treatment liquid, thereby obtaining a textile printing article for evaluation.

<Evaluation of Color Fastness to Rubbing and Suppression of Deterioration in Texture>

The textile printing articles for evaluation fabricated using the treatment liquid (A-1) of Examples 1-1, 1-8 to 1-11, and 1-7 were evaluated in the same manner as the evaluation of color fastness to rubbing described in 1, above and in the same manner as the evaluation of suppression of deterioration in texture described in 1, above. The evaluation results are shown in Table 3 below. The evaluation results for the textile printing articles for evaluation fabricated using the treatment liquid (A-1) used in Examples 1-1 and 1-7 have already been shown in Table 2 above, but are shown again in Table 3 below to aid understanding.

TABLE 3

| | Treatment liquid | | | Color fastness to rubbing | | | | Texture | |
| --- | --- | --- | --- | --- | --- | --- | --- | --- | --- |
| | Kind of treatment liquid | Ejected amount [g/m²] | Ink | Dry | | Wet | | Height | |
| | | | | Grade | Evaluation | Grade | Evaluation | [%] | Evaluation |
| Example 1-1 | A-1 | 20 | a | 4 | A | 3 | A | 110 | A |
| Example 1-8 | A-1 | 15 | a | 4 | A | 2-3 | B | 115 | A |
| Example 1-9 | A-1 | 30 | a | 4-5 | A | 2-3 | B | 105 | A |
| Example 1-10 | A-1 | 10 | a | 3-4 | B | 2-3 | B | 120 | A |
| Example 1-11 | A-1 | 120 (Applied amount) | a | 3-4 | B | 2-3 | B | 130 | B |
| Example 1-7 | A-1 | 20 | b | 4 | A | 3 | A | 110 | A |

As shown in Table 3 above, the color fastness to dry rubbing, color fastness to wet rubbing, and suppression of deterioration in the texture of textile printing articles fabricated in an ejected amount (including applied amount) of 10 g/m² or more and 120 g/m² or less were all evaluated as A or B in a case of using the treatment liquid (A-1) containing an amino-modified silicone oil as the silicone oil. Hence, it is determined that a textile printing article excellent in the color fastness to rubbing can be fabricated and deterioration in the texture of textile printing article can be suppressed by ejecting or applying the inkjet treatment liquid of the present embodiment in a wide range of ejected amount (including applied amount) of 10 g/m² or more and 120 g/m² or less.

As shown in Table 3 above, the color fastness to dry rubbing of textile printing articles fabricated in an ejected amount of 15 g/m² or more and 30 g/m² or less was evaluated as A in a case of using the treatment liquid (A-1) containing an amino-modified silicone oil as the silicone oil. Hence, it is determined that a textile printing article particularly excellent in the color fastness to dry rubbing can be fabricated by ejecting the inkjet treatment liquid of the present embodiment in an ejected amount in the range of 15 g/m² or more and 30 g/m² or less particularly in a case where the treatment liquid contains an amino-modified silicone oil.

3. Evaluation Test of Color Fastness to Rubbing and Ejectability when Percentage Content of Silicone Oil is Varied In this test, the amount of treatment liquid ejected during fabrication of textile printing articles was set to 5.1 g/m², which was less than that in the test of 1. above, and various textile printing articles were fabricated while changing the percentage content (and kind) of silicone oil in the treatment liquid. Thereafter, the color fastness to rubbing of various textile printing articles fabricated was evaluated. At the same time, the ejectability of the treatment liquid from the nozzle was also evaluated.

[Method for Preparing Treatment Liquid]

In this test, treatment liquids in which the percentage content of carboxy-modified silicone oil was varied to various values and treatment liquids containing both a carboxy-modified silicone oil and an unmodified silicone oil were used. Hereinafter, the methods for preparing treatment liquids (C-1) to (C-5) and treatment liquids (D-1) and (D-2) used in this test will be described in detail. The percentage content of silicone oil was calculated by rounding off to the first decimal place.

<Preparation of Treatment Liquid (C-1)>

A treatment liquid (C-1) was obtained by the same method as the method for preparing the treatment liquid (A-3) described in 1, above except that the amount of raw material emulsion B was set to 23.33 g, the amount of ion exchanged water was set to 43.32 g, and the amount of propylene glycol was set to 33.3 g. The percentage content of carboxy-modified silicone oil in the treatment liquid (C-1) was 7% by mass.

<Preparation of Treatment Liquid (C-2)>

The treatment liquid (C-2) is the same treatment liquid as the treatment liquid (A-3) described above. A different name was used for this evaluation test to facilitate comparison with other treatment liquids. In other words, the percentage content of carboxy-modified silicone oil in the treatment liquid (C-2) was 10% by mass.

<Preparation of Treatment Liquid (C-3)>

First, two raw material emulsions to be contained in a treatment liquid (C-3) were prepared. Specifically, 300 g of unmodified silicone oil (specifically, dimethylpolysiloxane) ("KF96-3000cs" manufactured by Shin-Etsu Chemical Co., Ltd., viscosity: 3,000 mm²/s, specific gravity: 0.97), 610 g of ion exchanged water, and 90 g of surfactant (polyoxyethylene alkyl ether) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a first raw material emulsion. Emulsified particles containing an unmodified silicone oil were dispersed in this first raw material emulsion. Furthermore, 300 g of carboxy-modified silicone oil ("X-22-3701E" manufactured by Shin-Etsu Chemical Co., Ltd., viscosity: 2,000 mm²/s, specific gravity: 0.98, functional group equivalent: 4,000 g/mol) was mixed, 600 g of ion exchanged water and 100 g of sodium hydroxide aqueous solution (concentration: 1 mol/L) were put into a beaker, and the same operation was performed to obtain a second raw material emulsion. Emulsified particles containing a carboxy-modified silicone oil were dispersed in this second raw material emulsion.

Next, the treatment liquid (C-3) was prepared using the first raw material emulsion and second raw material emulsion prepared as described above. Specifically, 16.67 g of first raw material emulsion (percentage content of unmodified silicone oil: 5% by mass), 16.67 g of second raw material emulsion (percentage content of carboxy-modified silicone oil: 5% by mass), 33.31 g of ion exchanged water, and 33.35 g of propylene glycol were mixed together to obtain the treatment liquid (C-3). In the treatment liquid (C-3), the percentage content of carboxy-modified silicone oil was 5% by mass, and the percentage content of unmodified silicone oil was 5% by mass.

<Preparation of Treatment Liquid (C-4)>

A treatment liquid (C-4) was obtained by the same method as the method for preparing the treatment liquid (A-3) described in 1, above except that the amount of raw material emulsion B was set to 43.33 g, the amount of ion exchanged water was set to 23.32 g, and the amount of propylene glycol was set to 33.35 g. The percentage content of carboxy-modified silicone oil in the treatment liquid (C-4) was 13% by mass.

<Preparation of Treatment Liquid (C-5)>

A treatment liquid (C-5) was obtained by the same method as the method for preparing the treatment liquid (A-3) described in 1, above except that the amount of raw material emulsion B was set to 50 g, the amount of ion exchanged water was set to 16.65 g, and the amount of propylene glycol was set to 33.35 g. The percentage content of carboxy-modified silicone oil in the treatment liquid (C-5) was 15% by mass.

<Preparation of Treatment Liquid (D-1)>

A treatment liquid (D-1) was obtained by the same method as the method for preparing the treatment liquid (A-3) described in 1, above except that the amount of raw material emulsion B was set to 20 g, the amount of ion exchanged water was set to 46.65 g, and the amount of propylene glycol was set to 33.35 g. The percentage content of carboxy-modified silicone oil in the treatment liquid (D-1) was 6% by mass.

<Preparation of Treatment Liquid (D-2)>

A treatment liquid (D-2) was obtained by the same method as the method for preparing the treatment liquid (A-3) described in 1, above except that the amount of raw material emulsion B was set to 53.33 g, the amount of ion exchanged water was set to 13.32 g, and the amount of propylene glycol was set to 33.35 g. The percentage content of carboxy-modified silicone oil in the treatment liquid (D-2) was 16% by mass.

Next, textile printing articles for evaluation were fabricated using the prepared treatment liquids (C-1) to (C-5) and treatment liquids (D-1) and (D-2), and the color fastness to rubbing thereof was evaluated.

<Method for Fabricating Textile Printing Articles for Evaluation of Examples 2-1 to 2-5 and Comparative Examples 2-1 and 2-2>

Regarding the fabrication of textile printing articles of Examples 2-1 to 2-5 and Comparative Examples 2-1 and 2-2, textile printing articles for evaluation were fabricated by the same method as the method for fabricating a textile printing article for evaluation described in 1, above, except that the following points were changed. Specifically, the ink shown in Table 4 later was filled in the first ink chamber of the first cartridge and any of the treatment liquids (C-1) to (C-5) or treatment liquids (D-1) and (D-2) shown in Table 4 later was filled in the second ink chamber of the second cartridge. The method for preparing the ink used is the same as the method described in 1, above. In Examples and Comparative Examples, the amount of treatment liquid ejected was set to 5.1 g/m$^2$ as described above. The amount of ink ejected was set to 20 g/m$^2$.

<Evaluation of Color Fastness to Rubbing>

The textile printing articles of Examples 2-1 to 2-5 and Comparative Examples 2-1 to 2-2 were evaluated in the same manner as the evaluation of color fastness to rubbing described in 1. above. The evaluation results of the textile printing articles of Examples and Comparative Examples are summarized in Table 4 below.

In this test, the ejectability of the treatment liquids (C-1) to (C-5) and treatment liquids (D-1) and (D-2) used in Examples and Comparative Examples from the processing head was also evaluated. Hereinafter, the method for evaluating ejectability will be described in detail.

<Evaluation of Ejectability>

An evaluation machine was prepared which included a mounting table for mounting a PET film and one recording head ("KJ4B Head" manufactured by KYOCERA Corporation) fixedly arranged above the mounting table. The mounting table has a function of conveying the textile printing target placed thereon by moving horizontally. The recording head was arranged at a position where the distance between the nozzle tip and the PET film was 3 mm. The recording head was set to be maintained at 5° C.

Ejectability of the treatment liquid was evaluated by printing a nozzle check pattern on the PET film. Specifically, the treatment liquid was filled in the recording head, a nozzle check pattern was printed in an ejected amount of 10 g/m$^2$, the nozzle check patterns from all the nozzles (2656 nozzles) were visually observed, and the nozzles were classified into those that were not ejecting normally (nozzles that were not ejecting the treatment liquid, nozzles that were not ejecting the treatment liquid straight, nozzles from which the treatment liquid was overflowing, and the like) and the other nozzles that were ejecting normally for evaluation. The evaluation criteria are shown below.

O (Pass): The total number of nozzles that are not ejecting normally is less than 10

X (Failure): The total number of nozzles that are not ejecting normally is 10 or more The kinds of treatment liquids (percentage contents and kinds of silicone oils) used in Examples and Comparative Examples, kinds of ink used in the fabrication of textile printing articles, and the evaluation results of color fastness to rubbing and ejectability are summarized in Table 4 below.

TABLE 4

| | Treatment liquid | | | | | Evaluation result | | |
| --- | --- | --- | --- | --- | --- | --- | --- | --- |
| | Kind of treatment liquid | Kind of silicone oil in treatment liquid | Amount of silicone oil in treatment liquid [wt %] | | | Color fastness to rubbing | | |
| | | | Amount [wt %] | Total amount [wt %] | Ink | Dry | Wet | Ejectability |
| Example 2-1 | C-1 | Carboxy-modified silicone oil | 7 | 7 | a | B | B | O |
| Example 2-2 | C-2 (A-3) | Carboxy-modified silicone oil | 10 | 10 | a | A | A | O |
| Example 2-3 | C-3 | Carboxy-modified silicone oil Unmodified silicone oil | 5 5 | 10 | a | A | A | O |
| Example 2-4 | C-4 | Carboxy-modified silicone oil | 13 | 13 | a | A | A | O |
| Example 2-5 | C-5 | Carboxy-modified silicone oil | 15 | 15 | a | B | B | O |
| Comparative Example 2-1 | D-1 | Carboxy-modified silicone oil | 6 | 6 | a | C | C | O |

TABLE 4-continued

|  | Treatment liquid | | | | Evaluation result | | |
|---|---|---|---|---|---|---|---|
|  | Kind of treatment liquid | Kind of silicone oil in treatment liquid | Amount of silicone oil in treatment liquid [wt %] | | | Color fastness to rubbing | |
|  | | | Amount [wt %] | Total amount [wt %] | Ink | Dry | Wet | Ejectability |
| Comparative Example 2-2 | D-2 | Carboxy-modified silicone oil | 16 | 16 | a | C | C | X |

As shown in Table 4 above, in all Examples 2-1 to 2-5 in which the treatment liquids (C-1) to (C-5) having a percentage content of silicone oil in the range of 7% by mass or more and 15% by mass or less were used, the color fastness to dry rubbing and the color fastness to wet rubbing were both evaluated as A or B. Particularly in all Examples 2-2 to 2-4 in which the treatment liquids (C-2) to (C-4) having a percentage content of silicone oil in the range of 10% by mass or more and 13% by mass or less were used, the color fastness to dry rubbing and the color fastness to wet rubbing were both evaluated as A, which was remarkably excellent.

On the other hand, regarding both the textile printing article of Comparative Example 2-1 in which the treatment liquid (D-1) having a percentage content of silicone oil of 6% by mass, which was less than 7% by mass, was used and the textile printing article of Comparative Example 2-2 in which the treatment liquid (D-2) having a percentage content of silicone oil of 16% by mass, which was more than 15%, was used, the color fastness to dry rubbing and the color fastness to wet rubbing were evaluated as C. In other words, when the percentage content of silicone oil in the treatment liquid is within the range of 7% by mass or more and 15% by mass or less, a textile printing article excellent in both the color fastness to dry rubbing and the color fastness to wet rubbing can be fabricated even in a case where the amount of the treatment liquid ejected is smaller (specifically, 5.1 g/m²) than that in the test described in 1, above as in this test.

Furthermore, as shown in Table 4 above, the treatment liquids (C-1) to (C-5) having a percentage content of silicone oil in the range of 7% by mass or more and 15% by mass or less exhibited favorable ejectability. On the other hand, when the percentage content of silicone oil exceeded 15% by mass, as in the treatment liquid (D-2) having a percentage content of silicone oil of 16% by mass, the solid amount increased and the ejectability from the processing head deteriorated.

4. Evaluation test of color fastness to rubbing of textile printing article of treatment liquid when amount of treatment liquid ejected is varied In this test, the above-described treatment liquid (C-2) (percentage content of silicone oil: 10% by mass) was used, textile printing articles were fabricated while varying the amount of treatment liquid ejected in a wider range, and the color fastness to rubbing of the textile printing articles was evaluated in more detail.

<Method for Fabricating Textile Printing Articles for Evaluation of Examples 2-2 and 2-6 to 2-9>

Regarding the fabrication of textile printing articles for evaluation of Examples 2-2 and 2-6 to 2-9, textile printing articles for evaluation were fabricated by the same method as the method for fabricating a textile printing article for evaluation described in 1, above, except that the following points were changed. The ink shown in Table 5 was filled in the first ink chamber of the first cartridge, and the treatment liquid (C-2) was filled in the second ink chamber of the second cartridge. In each Example, the amount of treatment liquid ejected was set to each ejected amount shown in Table 5 later. The amount of ink ejected was set to 20 g/m².

<Evaluation of Color Fastness to Rubbing>

The textile printing articles for evaluation fabricated using the treatment liquid (C-2) of Examples 2-2 and 2-6 to 2-9 were evaluated in the same manner as the evaluation of color fastness to rubbing described in 1, above. The evaluation results are summarized in Table 5 below together with the details of treatment liquid used, the amount of treatment liquid ejected per dot (pL/dot), the number of passes of the processing head until the entire ejected amount is placed on the cloth, the kind of ink used to fabricate textile printing articles, and each amount of treatment liquid ejected.

TABLE 5

| | Treatment liquid | | | | | | | Evaluation result | |
|---|---|---|---|---|---|---|---|---|---|
| | Kind of treatment liquid | Kind of silicone oil in treatment liquid | Amount of silicone oil in treatment liquid [wt %] | Ejected amount per dot [pL/dot] | Number of passes [times] | Ink | Ejected amount [g/m²] | Color fastness to rubbing | |
| | | | | | | | | Dry | Wet |
| Example 2-2 | C-2 | Carboxy-modified silicone oil | 10 | 9 | 1 | a | 5.1 | A | A |
| Example 2-6 | C-2 | Carboxy-modified silicone oil | 10 | 18 | 1 | a | 10.2 | A | A |
| Example 2-7 | C-2 | Carboxy-modified silicone oil | 10 | 18 | 2 | a | 20.5 | B | B |
| Example 2-8 | C-2 | Carboxy-modified silicone oil | 10 | 18 | 3 | a | 30.7 | B | B |
| Example 2-9 | C-2 | Carboxy-modified silicone oil | 10 | 18 | 4 | a | 41.0 | B | B |

As shown in Table 5 above, in a case of using the treatment liquid (C-2) containing a carboxy-modified silicone oil at 10% by mass, regarding the textile printing articles fabricated in a wide range of ejected amount (ejection only) of about 5 g/m² or more and 40 g/m² or less, a textile printing article excellent in both the color fastness to dry rubbing and the color fastness to wet rubbing can be fabricated. Specifically, in all the textile printing articles of Examples 2-2 and 2-6 to 2-9, the color fastness to dry rubbing and the color fastness to wet rubbing were evaluated as A or B. In particular, in the case of this test using the treatment liquid (C-2) containing a carboxy-modified silicone oil at 10% by mass, a textile printing article remarkably excellent in both the color fastness to dry rubbing and the color fastness to wet rubbing can be fabricated in an ejected amount of about 5 g/m² or more and 10 g/m² or less.

Since the textile printing article of Example 2-9 requires four times of passes, it is assumed that the amount of treatment liquid ejected is preferably 5 g/m² or more and 30 g/m² or less from the viewpoint of improving productivity.

It should be understood that the embodiments and Examples disclosed this time are illustrative in all points and not restrictive. The scope of the present disclosure is indicated by the claims rather than the above description, and is intended to include meanings equivalent to the claims and all modifications within the scope.

INDUSTRIAL APPLICABILITY

The inkjet treatment liquid, inkjet textile printing apparatus, and inkjet textile printing method according to the present disclosure can be used to fabricate textile printing articles.

The invention claimed is:

1. An inkjet treatment liquid, comprising:
   emulsified particles containing a silicone oil; and
   an aqueous medium,
   wherein a percentage content of the silicone oil is 7% by mass or more and 15% by mass or less, and
   the inkjet treatment liquid is a treatment liquid for post-processing.

2. The inkjet treatment liquid according to claim 1, wherein the percentage content of the silicone oil is 10% by mass or more and 13% by mass or less.

3. The inkjet treatment liquid according to claim 1, wherein the silicone oil includes at least an ionic functional group-containing silicone oil.

4. The inkjet treatment liquid according to claim 3, wherein the ionic functional group-containing silicone oil is a carboxy-modified silicone oil.

5. The inkjet treatment liquid according to claim 1, wherein the silicone oil includes at least an unmodified silicone oil.

6. The inkjet treatment liquid according to claim 5, wherein the unmodified silicone oil is dimethylpolysiloxane.

7. The inkjet treatment liquid according to claim 1, wherein the silicone oil includes an ionic functional group-containing silicone oil and an unmodified silicone oil.

8. The inkjet treatment liquid according to claim 7, wherein the ionic functional group-containing silicone oil is a carboxy-modified silicone oil.

9. The inkjet treatment liquid according to claim 1, wherein the emulsified particles include first emulsified particles containing an ionic functional group-containing silicone oil and second emulsified particles containing an unmodified silicone oil.

10. The inkjet treatment liquid according to claim 1, wherein the silicone oil includes an ionic functional group-containing silicone oil and an unmodified silicone oil, and
    the ratio of the mass of the ionic functional group-containing silicone oil to the mass of the unmodified silicone oil is 0.5 or more and less than 1.0.

11. The inkjet treatment liquid according to claim 1, which is for textile printing.

12. An inkjet textile printing apparatus, comprising:
    a recording head configured to eject ink onto an image forming region of a textile printing target;
    a processing head configured to eject a treatment liquid onto at least the image forming region of the textile printing target; and
    a cartridge filled with the treatment liquid,
    wherein the treatment liquid is the inkjet treatment liquid according to claim 9.

13. The inkjet textile printing apparatus according to claim 12, wherein the ink contains a pigment.

14. The inkjet textile printing apparatus according to claim 12, further comprising a heating unit configured to heat the textile printing target on which the ink and the treatment liquid are ejected.

15. An inkjet textile printing method, comprising:
    ejecting ink from a recording head onto an image forming region of a textile printing target; and
    ejecting a treatment liquid from a processing head onto at least the image forming region of the textile printing target,
    wherein the treatment liquid is the inkjet treatment liquid according to claim 1.

16. The inkjet textile printing method according to claim 15, wherein an amount of the inkjet treatment liquid ejected is 5 g/m² or more and 30 g/m² or less.

17. The inkjet textile printing method according to claim 16, wherein the amount of the inkjet treatment liquid ejected is 5 g/m² or more and 10 g/m² or less.

18. The inkjet textile printing method according to claim 15, wherein the ink contains a pigment.

19. The inkjet textile printing method according to claim 15, further comprising heating at least the image forming region of the textile printing target on which the ink and the treatment liquid are ejected.

* * * * *